(12) United States Patent
Haardt et al.

(10) Patent No.: US 6,311,043 B1
(45) Date of Patent: Oct. 30, 2001

(54) METHOD AND MEASUREMENT CONFIGURATION FOR MEASURING THE CHARACTERISTICS OF RADIO CHANNELS

(75) Inventors: Martin Haardt; Christopher Brunner, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/588,936

(22) Filed: Jun. 5, 2000

Related U.S. Application Data

(63) Continuation of application No. PCT/DE98/03146, filed on Oct. 27, 1998.

(51) Int. Cl.[7] .................................................... H04B 17/00
(52) U.S. Cl. ...................... 455/67.1; 455/456; 342/453; 342/378
(58) Field of Search ................ 455/67.1, 39, 67.2–67.4, 455/456, 457, 561, 562, 417, 132; 342/58, 109, 450, 451, 457, 357.01, 113, 115, 454, 461, 453, 378; 375/347, 148, 147

(56) References Cited

U.S. PATENT DOCUMENTS

| | | | |
|---|---|---|---|
| 4,965,732 | * 10/1990 | Roy, III et al. | 342/147 |
| 5,444,451 | * 8/1995 | Johnson et al. | 342/453 |
| 6,070,079 | * 5/2000 | Kuwahar . | |
| 6,084,928 | * 7/2000 | Kuwahara | 375/347 |
| 6,087,974 | * 7/2000 | Yu | 342/62 |
| 6,177,906 | * 1/2001 | Petrus | 342/378 |
| 6,215,983 | * 4/2001 | Dogan et al. | 455/63 |
| 6,240,098 | * 5/2001 | Thibault et al. | 370/431 |

FOREIGN PATENT DOCUMENTS

| | | |
|---|---|---|
| 195 11 751 A1 | 3/1995 | (DE) . |
| 195 11 752 A1 | 3/1995 | (DE) . |

OTHER PUBLICATIONS

Martin Haardt: "Efficient One–, Two–, and Multidimensional High–Resolution Array Signal Processing", ISBN 3–8265–2220–6, Mar. 1997, pp. 63–66.

Utz Martin: "Modeling the Mobile Radio Channel by Echo Estimation", Frequenz, 48 (1994), vol. 9, pp. 198–212.

David G. Luenberger: "Optimization By Vector Space Methods", John Wiley and Sons, Inc., New York, 1969, pp. 82, 83.

Simon Haykin: "Communication Systems", John Wiley and Sons, Inc., 3rd edition 1994, pp. 431–434.

(List continued on next page.)

*Primary Examiner*—Daniel Hunter
*Assistant Examiner*—Pablo Tran
(74) *Attorney, Agent, or Firm*—Herbert L. Lerner; Laurence A. Greenberg; Werner H. Stemer

(57) ABSTRACT

The characteristics of radio channels are measured. The signals received by a plurality $M_c$ of receiving sensors of a two-dimensional antenna array are composed of wave elements of a transmission signal with regard to the azimuth and the elevation of a different two-dimensional incidence direction and different delay. The transmission signal contains a preselected test sequence, and the incidence angle as well as the delay of the dominant wave fronts are estimated simultaneously taking account of the chip signal form of the test sequence. The signals of each antenna sensor are demodulated, and sampling is then carried out with $M_c$ samples per chip in the test sequence. The resultant samples are transformed to the frequency domain by discrete Fourier transformation, and the resultant values are corrected taking account of the spectrum of the chip signal form, wherein the line vectors formed from the values obtained for each sensor can be combined to form a data matrix $X_F$, which contains invariances that characterize the channel in the space/frequency domain.

19 Claims, 2 Drawing Sheets

OTHER PUBLICATIONS

Martin Haardt: "Efficient High–Resolution 3–D Channel Sounding", pp. 164–168, XP–002097969.

Martin Haardt: "3–D Unitary ESPRIT for joint 2–D Angle and Carrier Estimation", pp. 255–258, XP–002097970.

Josef Fuhl et al.: "High–Resolution 3–Direction–of–Arrival Determination for Urban Mobile radio", pp. 672–682, XP–000686403.

Martin Haardt et al.: "2D Unitary ESPRIT for Efficient 2D Parameter Estimation", pp. 2096–2099, XP–002009163.

Richard Roy et al.: "ESPRIT—Estimation of Signal Parameters Via Rotational Invariance Techniques", pp. 984–995, XP–000037318.

* cited by examiner

METHOD AND MEASUREMENT CONFIGURATION FOR MEASURING THE CHARACTERISTICS OF RADIO CHANNELS

CROSS-REFERENCE TO RELATED APPLICATION

This is a continuation of copending international application PCT/DE98/03146, filed Oct. 27, 1998, which designated the United States.

BACKGROUND OF THE INVENTION

Field of the Invention

The invention lies in the telecommunications field. More specifically, the invention relates to a method for measuring the characteristics of radio channels, in which the received signals are received by a number of receiving sensors in a two-dimensional antenna array, with the respective received signals being composed of wave elements of a transmitted signal with regard to the azimuth and elevation of different two-dimensional incidence direction and different delay.

The invention also relates to a measurement configuration for measuring the characteristics of radio channels having a planar antenna array, having a number of antenna sensors, in which case each antenna sensor is followed by analog/digital sampling, a filter matched to the signal and stage for discrete Fourier transformation, and at least one signal processor is provided for the reception stages.

In a large number of applications, such as sonar, radar, satellite communication and mobile radio, high-resolution radio channel measurements, which also supply direction information, are desirable. A radio channel represents, for example, the link between the base station and mobile stations. Increasing capacity requirements and limited frequency resources necessitate increased spectral efficiency. In this context, a noticeable improvement can be achieved by the use of intelligent antenna arrays at base stations, making use of the spatial diversity inherent in the radio channel. Two-dimensional array geometries allow estimation of both the azimuth and elevation angle of the dominant, that is to say the most powerful, for example, wave fronts which arrive at the array. For example 2D unitary ESPRIT is an efficient method, with an enclosed nature, for estimating automatically paired azimuth and elevation angles, as is described by Haardt, Zoltowski, Mathews, and Nossek, in "2D Unitary ESPRIT for Efficient 2D Parameter Estimation," in Proc. IEEE Int. Conf. Acoust., Speech, Signal Processing, vol. 3, 2096–99, Detroit, Mich. May 1995.

Detailed knowledge of the dominant azimuthal elevation angles for the mobile radio channel is essential in order to allow effective intelligent antenna concepts to be developed for future mobile radio systems. If the elevation of the dominant wave fronts is taken into account, this helps, for example, to considerably reduce the near-far problem in mobile radio systems as is particularly important, for example, for CDMA systems (Code Division Multiple Access) with direct sequences. Sophisticated concepts using intelligent antennas are of major interest, not least of commercial interest as well, for various mobile radio systems, in particular 3rd generation mobile radio systems.

It is thus essential to find and to evaluate the statistics of the two-dimensional incidence directions and delays of the arriving wave fronts.

Based on the fact that determination of only the azimuth of the arriving wave fronts results in a considerable error if the elevation of the arriving wave fronts is high, a 3D channel investigation method has been disclosed by Fuhl, Rossi, and Bonek, in "High-resolution 3D direction-of-arrival determination for urban mobile radio", IEEE Trans. Antennas and Propagation, vol. pp. 672–682, April 1997. In this reference, the authors describe a measurement configuration for channel investigation, in which high-resolution estimates of the 2D incidence directions (azimuth and elevation) of the dominant propagation paths are determined by solving a two-dimensional harmonic search problem separately for each estimated impulse-response delay time. The channel tester used in this case transmits a carrier at $f_0$=890 MHz, which is phase-modulated at 15 Mbits/s with a maximum length binary sequence which contains 511 bits. The measurements obtained on a uniform rectangular array of identical antennas are then demodulated, are mixed to baseband and are decomposed in order to obtain the I and Q components. The complex envelope curves obtained in this way are correlated with the maximum length binary sequence in order t o obtain the impulse response separately for each sensor in the antenna array. These impulse responses are stored for further processing. Both angles, namely the azimuth and elevation, of the dominant wave fronts arriving at the antenna array are determined jointly via the already mentioned 2D unitary ESPRIT, separately for each predetermined delay time. In this context, reference should also be made to M. Haardt, "Efficient One-, Two, and Multidimensional High-Resolution Array Signal Processing," Dissertation, Munich Technical University 1996, ISBN 3-8265-2220-6 (pages 63–66). Spatial smoothing with overlapping subgroups is used as a preprocessing step for decorrelation of coherent waves and, finally, the angles and amplitudes of the wave fronts are estimated separately for each delay time.

This 2D unitary ESPRIT method has been used successfully in various field-experiments using the channel tester and a uniform rectangular antenna array, with pairs of 2D incidence angle estimates being provided automatically for the dominant propagation paths. The measurement results form a basis for investigation and evaluation of beam tracking models and for the parameters of directional channel models. In most known measurement configurations, the (virtual) antenna array was installed at the base station, and the transmissions were made from the mobile station. In the cited reference IEEE Trans. Antennas and Propagation, the transmitter is provided at the base station and the (virtual) antenna array is mobile. In various known measurement trials, the antenna array has been simulated by moving an individual antenna to the positions of antenna elements in the virtual antenna array. In this case, particular attention has to be paid to exact positioning and careful synchronization between the transmitter and receiver, in which context reference is also made to U. Martin, "Modeling the Mobile Radio Channel by Echo Estimation," Frequenz, vol. 48, pp. 198–212, 1994. The reference which has already been referred to twice from IEEE Trans. Antennas and Propagation also shows that the use of the 2D unitary ESPRIT method leads to a resolution which is an order moving an individual antenna to the positions of antenna elements in the virtual antenna array. In this case, particular attention has to be paid to exact positioning and careful synchronization between the transmitter and receiver, in which context reference is also made to Martin, "Modeling the Mobile Radio Channel by Echo Estimation," Frequenz, vol. 48, pp. 198–212, 1994. The above-mentioned text from IEEE Trans. Antennas and Propagation also shows that the use of the 2D unitary ESPRIT method leads to a resolution which is an order of magnitude better than that for conventional Fourier analysis.

Furthermore, Roy and Kailath, in "ESPRIT Estimation of Signal Parameters Via Rotational Invariance Techniques," appearing in IEEE Transactions on Acoustics, Speech and Signal Processing, Vol. 37, No. 7, July 1989, pages 984–995 disclose a method using which the incidence direction of received wave fronts can also be estimated. German published patent application DE 195 11 752 A1 discloses a method for high-resolution evaluation of signals for direction or frequency estimation.

Josef Fuhl et al., "High-Resolution 3-D Direction-of-Arrival Determination for Urban Mobile Radio", IEEE Transactions on Antennas and Propagation, Volume 45, No. 4, April 1997, pages 672–682 describes a method for estimating the direction of electromagnetic waves arriving at a receiver in which, after previously determining the propagation time delays of the electromagnetic waves, the azimuth and elevation angles are determined at the same time.

SUMMARY OF THE INVENTION

It is an object of the invention to provide a method and a measurement configuration for measuring the characteristics of radio channels which overcome the disadvantages of the above-noted prior art methods and devices of the general kind and which allows for the simultaneous determination of azimuth and elevation as well as the delay of the dominant wave fronts with higher accuracy, in short measurement times, and with little computation complexity.

With the above and other objects in view there is provided, in accordance with the invention, a method for measuring characteristics of radio channels, which comprises:

transmitting a transmission signal containing a preselected test sequence;

receiving received signals with a plurality of receiving sensors in a two-dimensional antenna array, the respective received signals being composed of wave elements of the transmission signal with regard to an azimuth $\phi_k$ and an elevation $\theta_k$ of different incidence direction and different delay;

demodulating and subsequently sampling the received signals;

calculating eigenvalues corresponding to dominant eigenvalues with samples obtained in the sampling step, and deriving a signal subspace matrix from the calculated eigen vectors;

establishing invariance equations dependent on the signal subspace matrix; and simultaneously determining estimated values for the incidence direction and delays of dominant wave fronts by solving the invariance equations.

When the azimuth, elevation and delay are being estimated, a data matrix contains two spatial invariance and one time invariance superimposed for each wave front.

The two spatial frequencies can be converted very easily to the incidence direction of the wave fronts at the measurement station (azimuth and elevation), and the associated time frequency can very easily be converted to the associated delay at the measurement configuration.

The invention determines the spatial and time invariances superimposed in the data matrix for each dominant wave front and converts them into corresponding angles and delays for each dominant wave front. Furthermore, the complex amplitudes can be estimated on the basis of the estimated three-dimensional parameters.

In accordance with an added feature of the invention, improved results are widely obtained if the test sequence has a chip signal form and the simultaneous estimation is carried out taking account of the chip signal form of the test sequence.

Advantageous signal processing is obtained if the signals of each antenna sensor are demodulated, and sampling is then carried out with a total of $M_c$ samples per chip in the test sequence.

In order to achieve simple signal processing, it is also expedient if the result ant samples are transformed to the frequency domain by discrete Fourier transformation, and/or the resultant values are corrected taking account of the spectrum of the chip signal form, in which case the line vectors formed from the values obtained for each sensor can be combined to form a data matrix XF, which contains invariances which characterize the channel in the space/frequency domain.

Compared with the prior art methods, the invention allows the accuracy to be increased noticeably, and the computation complexity to be reduced in the same way as the measurement time. The invention can be used expediently particularly in the mobile radio field, but is in no way limited to this field. Its advantages are also evident, for example, in sonar applications and in radar technology. This means that the method according to the invention is not limited to "radio channels" using radio waves but can also be used, for example, for ultrasound channels.

One expedient variant of the invention provides for a modulated pseudo-random noise sequence to be used as the transmitted signal. The use of such a pseudo-random noise sequence results in the advantage that, on the one hand, it is easy to produce but, on the other hand, is easy to evaluate.

Simple signal processing is also achieved if the signals of each antenna sensor are mixed to baseband before being demodulated.

In accordance with an additional feature of the invention, the sample signals are filtered, matched to the signal, since this results in the signal-to-noise ratio being optimized. Furthermore, it is expedient if the received signals are oversampled, that is to say they are sampled at a sampling frequency which is greater than twice the received signal bandwidth, since this allows an improvement in the signal-to-noise ratio to be achieved.

In order to keep the influence of noise low, it is recommended that, once the samples have been transformed to the frequency domain, with values which are below a power limit that can be predetermined are rejected. Specifically, this also results in reduced computation complexity.

In one expedient variant, once they have been transformed to the time domain, the samples are corrected by division by the square of the spectrum of the chip signal form, since this improves the time invariance structure of the sampled data. domain involves less computation complexity and gives more accurate estimation results.

In this case, it is worthwhile if the joint estimation is carried out using the weighted least squares method, since this corresponds to the realistic estimate with minimum variance. In this context, reference should be made to D.G. Luenberger, Optimization by Vector Space Models, John Wiley and Sons, New York, N.Y., 1969 (pages 82–83).

With the above and other objects in view there is provided, in accordance with the invention, a measurement configuration for measuring characteristics of radio channels, comprising:

a linear antenna array;

a plurality of receiving sensors;

an analog/digital sampling device connected to an output of one of said receiving sensors;

a matched filter connected to said sampling device;

a device for discrete Fourier transformation; and at least one signal processor configured to perform the above-outlined method of the invention.

Other features which are considered as characteristic for the invention are set forth in the appended claims.

Although the invention is illustrated and described herein as embodied in a method and measurement configuration for measuring the characteristics of radio channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
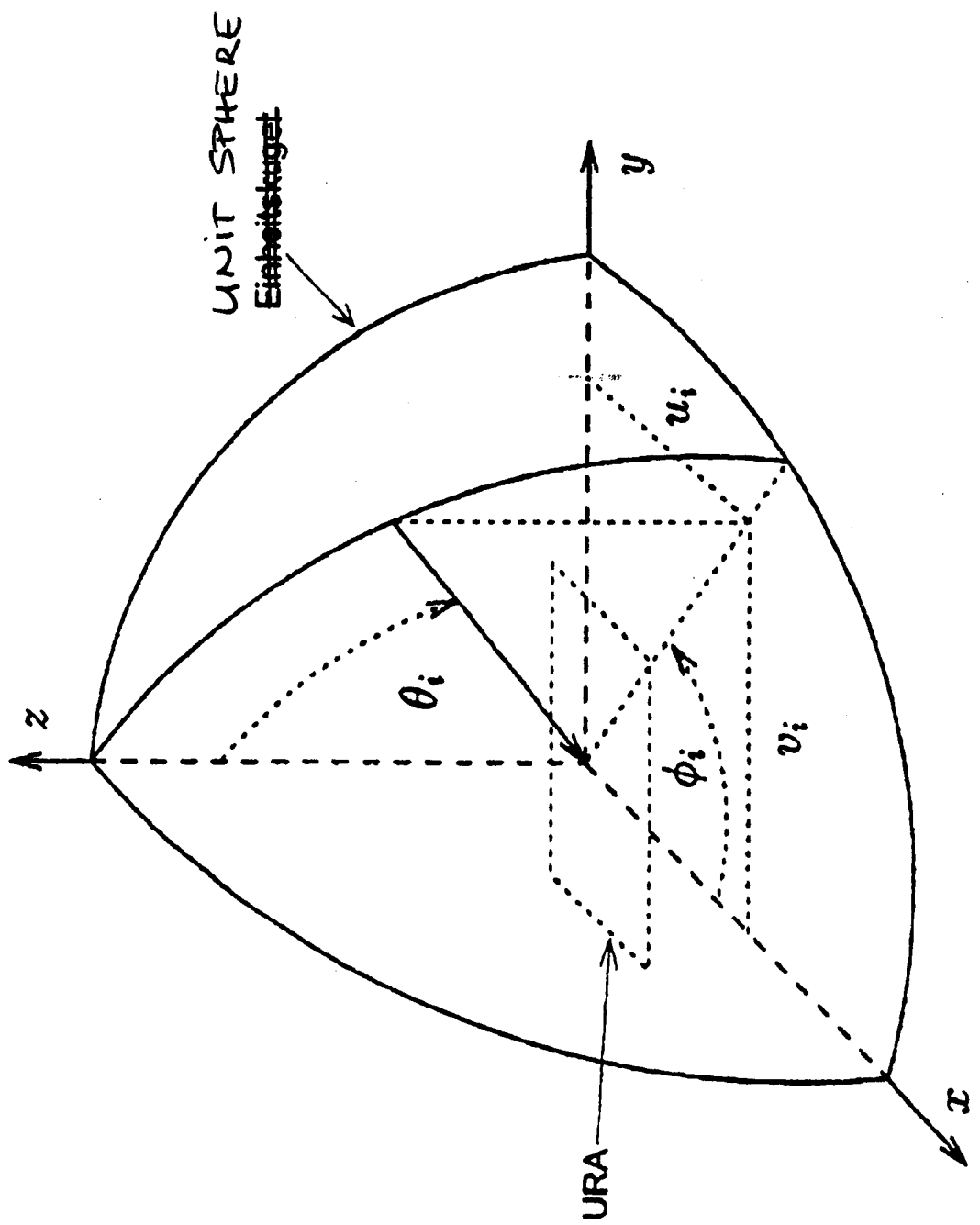
FIG. 1 is a diagram illustrating the definition of azimuth and elevation.

In the following text, the invention will be briefly summarized and it will then be explained in more detail with reference to the detailed method steps and a number of exemplary embodiments.

The novel method starts out from the above-noted reference IEEE Trans. Antennas and Propagation, in which the carrier is phase-modulated with a maximum length binary sequence which contains 511 bits. After demodulation and down-mixing, the complex envelope curve comprises a sequence of rectangular chips. In contrast to the prior art methods, the invention allows the use of different chip signal forms, however. Even in the case of a rectangular chip signal form, as in the above-mentioned German patent application DE 195 11 751 Al, the invention improves the performance significantly if more than one sample is taken for each chip. In this context, it should be noted that, if sampling is carried out once per chip ($M_c=1$), correlation with the PN sequence (pseudo-random noise sequence) in the time domain leads to a peak. However, if $M_c=2$ correlation produces three peaks which are interpreted as three wave fronts with identical incidence directions but with different amplitudes and delays. In order to avoid this ambiguity and thus inaccurate estimates, the chip signal form during oversampling must be considered. If other chip signal forms are used—and this will be explained further below—the performance is improved even if sampling is carried out only once per chip, that is to say $M_c=1$.

In the known method, it is assumed that the space/frequency correlation matrix of the additive noise (plus interference noise) $R_{nn}$ is equal to the scaled identity matrix, that is to say $$R_{nn}=\sigma_n^2 I \qquad (1)$$

Equation (1) is not generally applicable even if the noise in the space/time domain is uncorrelated in space and time. The invention can, however, also process colored noise in the space/frequency domain. The space/frequency correlation matrix of the additive noise is estimated, for example, while active operation is not taking place, and this will also be explained below. If the statistics of the incident noise are known, the noise covariance matrix in the space/frequency domain can also be calculated. The high-resolution, directionally sensitive unitary ESPRIT algorithm is appropriately modified for the invention.

Since only the parameters of the dominant wave fronts are estimated, weak wave fronts may be interpreted as colored noise. The covariance matrix for this noise can be estimated by subtracting the covariance matrix for the estimated dominant wave fronts from the estimated covariance matrix of all the wave fronts. This allows the estimation accuracy to be improved further.

The 3D unitary ESPRIT method allows joint estimation of the 2D incidence directions, which contain azimuth and elevation, and estimation of the delay of the dominant wave fronts. These parameter estimates are carried out automatically, in pairs. The accuracy which can be achieved in this way is extremely high. It can be shown that the performance of the 3D unitary ESPRIT method comes very close to the Cramer-Rao lower limit for realistic signal-to-noise ratios (SNR$\geq$5dB). In the method which has been mentioned a number of times above, the impulse response is estimated separately for each sensor. The two-dimensional incidence directions are then estimated separately for each delay time in the raster. Owing to the relatively large separations, this leads to a deterioration in the time resolution. There is thus a possible compromise between time resolution and computation complexity. The invention avoids this compromise by joint estimation of the parameters, resulting in a considerable increase in the accuracy, compared with the known method. It has been noticed that the computation complexity for channel investigation algorithms which are based on solving the maximum likelihood is considerably greater than with the 3D unitary ESPRIT method.

In the prior art method, the amplitudes are estimated for fixed delay times, this being based on the incidence directions estimated for corresponding fixed delays in the space/time domain. In contrast, with the invention, the accuracy is better both for the delays and for the 2D incidence directions, owing to the joint parameter estimation mentioned above.

Furthermore, the amplitudes can be estimated taking account of both the incidence directions and the delays jointly. This significantly improves the accuracy of the amplitude estimation. The estimation may be carried out either in the space/frequency domain or in the space/time domain, with the results obtained in the space/time domain generally being more accurate.

Since it is assumed that the channel does not vary with time during the channel investigation, it is worthwhile limiting the measurement time to a brief interval. This may be done by reducing the number of samples, without the results deteriorating—compared with the known method. The accuracy when using the invention can be noticeably improved by taking account of the chip signal form. In this way, the number of available samples can be increased by oversampling, in order to achieve better accuracy. In this context, it should be noted that oversampling in the case of the method known from the cited reference (IEEE Trans. Antennas and Propagation) leads to a model error.

A noticeable improvement in the resultant estimation accuracy is obtained by joint estimation of the parameters, based on the 3D unitary ESPRIT method. Furthermore, with the invention, the amplitudes can be estimated in the space/frequency domain or the space/time domain using previously estimated delays or 2D incidence directions, and this leads to a further improvement in accuracy.

In order to explain the invention in more detail, the following text assumes that the channel remains invariant over time over P pulse trains. The test signal comprises P pulse sequences which are modulated with a PN sequence, as is described in (S. Haykin, Communication Systems, John Wiley & Sons, New York, N.Y., 3rd edition, 1994 (pages 431–434), and can be written as follows:

$$s(t) = \sum_{i=0}^{P-1} c(t-iT) \text{ with } c(t) = \sum_{m=0}^{N_c-1} d_m p_c(t - mT_c).$$

In this case, $N_c$ is the number of chips in a PN sequence, defined by $d_m$, $1 \leq m \leq N_c-1$. In the above equation, $T_c$ denotes the chip duration, T the sequence duration and $P_c(t)$ the chip signal form. By way of example, the so-called "raised cosine" signal form can be used, which is defined a follows:

$$p_c(t) = \sqrt{\frac{E_c}{T_c}} \cdot \text{sinc}(2W_n t) \cdot \frac{\cos(2\pi \beta W_n t)}{1-(4\beta W_n t)^2},$$

where $$W_n = \frac{1}{2 \cdot T_c}$$

with $\beta$ being referred to as the roll-off factor and $W=W_n(1+\beta)$ being the required signal bandwidth (see S. Haykin, Communication Systems, John Wiley & Sons, New York, N.Y., 3rd edition 1994). $W_n$ denotes the signal bandwidth of a Nyquist channel ($\beta=0$). In order to satisfy the Nyquist condition, the sampling interval must be less than or equal to $T_c/(1+\beta)$.

It is also assumed that the (mobile) radio station is located in the far field of the antenna array, so that the incident wave fronts are approximately planar. The narrowband assumption is valid: if the complex envelopes of the incident wave fronts differ only insignificantly along the antenna array during the propagation time. The signal model thus includes the delay, the amplitude and the 2D incidence directions of each wave front arriving at the measurement station's antenna array. Without involving any loss of generality, a uniform rectangular array URA having $M_1$ sensors in the x direction and $M_2$ sensors S1 ... S4 in the y direction is used at the receiving station (see FIG. 2). K narrowband planar wave fronts with the wavelength $\lambda$, with the azimuth $\phi_k$ and the elevation $\theta_k$ (see FIG. 1) and the amplitude $\rho_k$, $1 \leq k \leq K$ arrive at the array. The noisy measurements can be formed to give:

$$x(t)=AD_s s(t)+n(t). \qquad (4)$$

where the sensor outputs at the time t are written one above the other in a column vector x(t), so that the control matrix of the array $$A=[a(\mu_1^{(1)},\mu_1^{(2)}) \; a(\mu_2^{(1)},\mu_2^{(2)}) \ldots a(\mu_K^{(1)},\mu_K^{(2)})] \in C^{M_1 M_2 \times K} \qquad (5)$$

satisfies the condition for central symmetry. Here, the spatial frequencies in the x-direction, $\mu_i^{(1)}$ and the spatial frequencies in the y-direction, $\mu_i^{(2)}$ are scaled versions of the corresponding direction cosines, namely $$\mu_i^{(1)} = \frac{2\pi}{\lambda}\Delta_x u_k \text{ and } \mu_k^{(2)} = \frac{2\pi}{\lambda}\Delta_y v_k \quad 1 \leq k \leq K \qquad (6)$$

where $$u_k = \cos \phi_k \sin \Theta_k \text{ and } v_k = \sin \phi_k \sin \Theta_k, \; 1 \leq k \leq K \qquad (7)$$

denote the direction cosines of the i-th source with respect to the x and y axes as shown in FIG. 1. The angles $\phi_k$ and $\theta_k$ denote the azimuth and the elevation of the k-th wave front. The scalars $\Delta_x$ and $\Delta_y$ denote the distance between the sensors in the x and y directions, and the superscript index$^t$ denotes the transposition. The control vectors for the array are defined as $$a(\mu_k^{(1)},\mu_k^{(2)}) = a(\mu_k^{(2)}) \otimes a(\mu_k^{(1)}) \qquad (8)$$

where $$a(\mu_k^{(1)})=[1 e^{j\mu_k^{(1)}} \ldots e^{j(M_1-1)\mu_k^{(1)}}]^T, a(\mu_k^{(2)})=[1 e^{j\mu_k^{(2)}} \ldots e^{j(M_1-1)\mu_k^{(2)}}]^T$$

Owing to multipath propagation, s(t) contains K different delayed versions of the test signal as follows:

$$s(t)=[s(t-\tau_1) \; s(t-\tau_2) \ldots s(t-\tau_k) \ldots s(t-\tau_k)]^T. \qquad (9)$$

where $\tau_k$ denotes the unknown propagation delay of the k-th wave front. It should be remembered that, in contrast to the method according to the prior art and referred to initially, the 3D parameters of the dominant wave fronts are estimated jointly, namely the azimuth angles, the elevation angles and the delays of the incident wave fronts. The K×K diagonal matrix $D_s$ is given by $$D_s = \text{diag}\{P_1, P_2, \ldots, P_k\},$$

where $\rho_k$ denotes the amplitude of the multiple paths k and $n(t) \in C^{M_1 M_2}$ denote the additive noise. The spatial noise covariance matrix is defined as $$R_{nn,s}=E\{nn^H\} \in C^{M_1 M_2 \times M_1 M_2} \qquad (10)$$

The signal received at each antenna is sampled at a rate $$f_s = \frac{M_c}{T_c}.$$

The number of samples per chip $M_c$, which is equivalent to the oversampling factor, is assumed to be an integer. X denotes the $M_1 M_2 \times M_3$ complex data matrix, which comprises $M_3=N_c M_c$ samples $x(nT_c/M_c)$, $1 \leq n \leq M_3$. These measurements are sampled simultaneously on all $M_1 M_2$ sensors.

The sampled output of each antenna is passed through a filter having the impulse response $h[n]=c[-n]$, where $c[n]=c(nT_c/M_c)$. $X_{MF}$ denotes the $M_1 M_2 \times M_3$ matrix whose $i^{th}$ column contains $M_3$ values of the output of the $i^{th}$ antenna after the matched filter. It should be remembered that the convolution process is carried out in the time domain. Based on equation (4), $X_{MF}$ can be expressed as $$X_{MF} = A \sum_s C, \qquad (11)$$

where C is a K×M$_3$ matrix, given by:

$$C = \begin{bmatrix} r_{cc}(-\tau_1) & r_{cc}\left(\frac{T_c}{M_c}-\tau_1\right) & \cdots & r_{cc}\left((M_3-1)\frac{T_c}{M_c}-\tau_1\right) \\ r_{cc}(-\tau_2) & r_{cc}\left(\frac{T_c}{M_c}-\tau_2\right) & \cdots & r_{cc}\left((M_3-1)\frac{T_c}{M_c}-\tau_2\right) \\ \vdots & \vdots & & \vdots \\ r_{cc}(-\tau_K) & r_{cc}\left(\frac{T_c}{M_c}-\tau_K\right) & \cdots & r_{cc}\left((M_3-1)\frac{T_c}{M_c}-\tau_K\right) \end{bmatrix} \quad (12)$$

In this case, the autocorrelation function of the spread signal form c(t) in equation (2) is defined as $$r_{cc}(\tau) = c(\tau) * c(-\tau), \quad (13)$$

in which * denotes the convolution. The transformation of the space/time channel model to a space/frequency channel model is achieved by right-multiplication of $X_{MF}$ by the $N_cM_c \times M_3$ DFT (discrete Fourier transformation) matrix W:

$$X_F = X_{MF} W \quad (14)$$

If the number of frequency bins is a power of 2, highly computer-efficient FFT algorithms (Fast Fourier Transformation) can be used to calculate equation (14).

Figure 2:
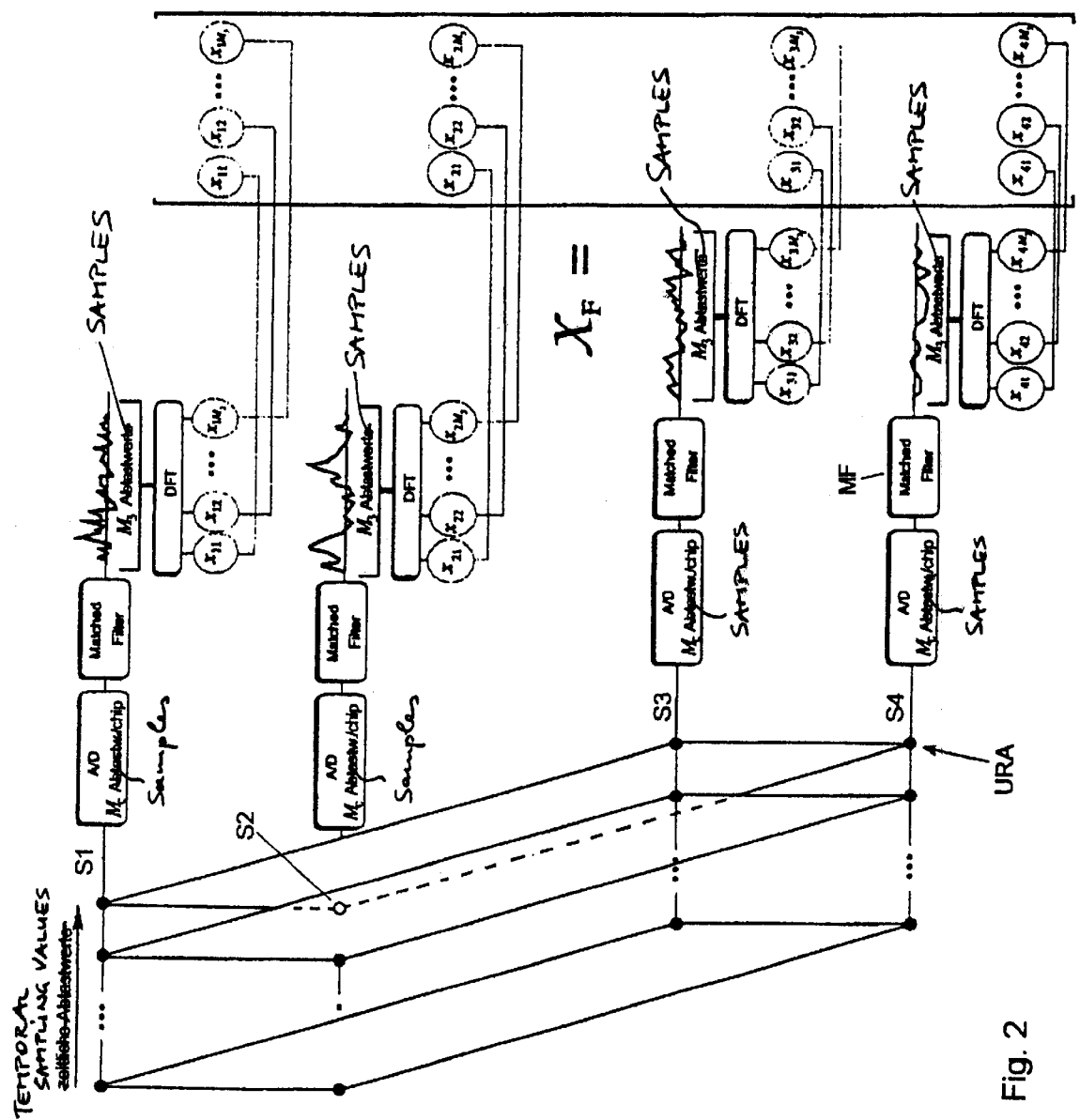
FIG. 2 is a schematic diagram of the process involved in the method according to the invention, based on the individual antennas of a uniform rectangular antenna assembly, as far as the data matrix which represents the channel model.

The above text has described how the matrix $X_F$ is obtained, and this is also shown in FIG. 2. This shows a uniform rectangular antenna array URA, which in this case comprises 2×2 elements. The time profile of the samples is in this case shown symbolically from left to right, and the number of samples is denoted $M_3$. Analog/digital conversion with $M_c$ samples per chip is envisaged for each of the sensors, in each case followed by one matched filter MF. The $N_cM_c$ samples are subjected to discrete Fourier transformation leading to the values $X_{1,1} \ldots X_{1M_3}$ to $X_{4,1} \ldots X_{4,1} \ldots X_{4M_3}$, resulting in the space/frequency data matrix $X_F$ shown on the extreme right.

Sampling of (13) gives $$r_{cc}[n] = r_{cc}\left(n\frac{T_c}{M_c}\right).$$

The vector containing $N_cM_c$ sampled correlation values of the correlation function is transformed into the frequency domain using $$r_{DFT} = W^T \begin{bmatrix} r_{cc}[0] \\ r_{cc}[1] \\ \vdots \\ r_{cc}[N_cM_c - 1] \end{bmatrix}, \quad (15)$$

where W is the $N_cM_c \times M_3$ DFT matrix. The chip signal form can be taken into account by modification of the space/frequency domain data matrix $X_F$ in equation (14) as follows:

$$X_F = X_F \text{diag}(r_{DFT}))^{-1} \quad (16)$$

The coefficients in $r_{DFT}$ may be very close to zero, or may be zero. Only those $M_3 \leq N_cM_c$ frequency bins in (14) are calculated which are not multiplied by the reciprocals of very small coefficients of $r_{DFT}$, in order to avoid amplifying the noise. The smoothing process will now be explained in the following text.

The matrix $X_{F'}$ may be interpreted as a single sample of a (virtual) uniform, cubic arrangement of the variable $M_1 \times M_2 \times M_3$. 3D space/frequency smoothing using overlapping subgroups is thus important, as described in the already mentioned dissertation by M. Haardt. It should be remembered that 1D smoothing can be applied to all three dimensions independently of one another by splitting the $M_r$ measurements of the r-th dimension into $L_r$ groups (or subgroups), each of which contains $M_{sub_r} = M_r - L_r + 1$ measurements. The corresponding 1D selection matrices are given by:

$$J_{l_r}^{(M_r)} = [0_{M_{sub_r} \times (l_r-1)} I_{M_{sub_r}} 0_{M_{sub_r} \times (L_r-l_r)}], \; 1 \leq l_r \leq L_r, \; 1 \leq r \leq 3. \quad (17)$$

we define the following $$L = \prod_{r=1}^{3} L_r$$

3-D selection matrices as $$J_{l_1,l_2,l_3} = J_{l_3}^{(M_3)} \otimes J_{l_2}^{(M_2)} \otimes J_{l_1}^{(M_1)} \in R^{M_{sub} \times M}, 1 \leq l_r \leq L_3. \quad (18)$$

where $$M_{sub} = \prod_{r=1}^{3} M_{sub_r} \text{ and } M = \prod_{r=1}^{3} M_r.$$

Using $X_{F'} = \text{vec}\{X_{F'}\}$, the smoothed data matrix whose size is $M_{sub} \times L$ is defined as follows:

$$X_{sub,F'} = [J_{1,1,1} \times_{F'} J_{1,1,2} \times_{F'} \cdots J_{1,1,L_3} \times_{F'} J_{1,2,1} \times_{F'} \cdots J_{L_1,L_2,L_3} \times_{F'}] \quad (19)$$

In order to estimate the order of the model, it is assumed that the channel does not vary with time over the time period T·P, that is to say over P data matrices $X_{F'}$ of sequence duration T. The P data matrices can be combined in accordance with $$X_{sub} = [X_{sub,F'}(1) X_{sub,F'}(2) \ldots X_{sub,F'(i)} \ldots X_{sub,F'}(P)] \in C^{M_{sub} \times LP}$$

for more accurate estimation of the model order, namely in order to estimate the number of dominant wave fronts K. In this case as well, weak wave fronts are regarded as noise.

The methods for estimating the model order are based on theoretical information criteria such as those quoted, for example, in the already mentioned dissertation by M. Haardt or in M. Wax and T. Kailath, "Detection of signals by information theoretic criteria", IEEE Trans. Acoustics, Speech, and Signal Processing, vol. ASSP-33, pages 387–392, April 1985, or they are based on specific threshold value methods, in which context reference should be made to U. Martin, "Ausbreitung in Mobilfunkkanalen: Beiträge zum Entwurf von Meßgeräten und zur Echoschätzung" ["Propagation in mobile radio channels: Contributions to the design of test equipment and to echo estimation" ], Dissertation, Erlangen University, October 1994 (pages 164–180). The use of the MDL criterion (Maximum Description Length), which takes account of forward-reverse averaging and smoothing, is expediently evident from the dissertation by Haardt. The statistical assumptions in the said dissertation by U. Martin which are required for the MDL criterion are no longer valid for oversampling. It is thus better to use the MDL criterion separately for each of the M, samples of a chip, for all the chips. The M, estimates of the model order are then averaged in order to obtain the true model order.

The following text describes the use of the 3D unitary ESPRIT method with colored noise. If the noise n according to equation (4) is white and the chip signal form is rectangular, the transformed noise $n_F$ is white only if no oversampling is carried out. The smoothed noise covariance matrix in the space/frequency domain is defined as:

$$R_{nn} = E\{n_{F\,sub} n_{F\,sub}^H\} \in C^{M_{sub} \times M_{sub}} \quad (20)$$

For each integer p, $I_p$ denotes the p×p identity matrix and $\Pi_p$ denotes the p×p substitute matrix, whose diagonal has ones while, in contrast, there are zeros everywhere else:

$$\Pi_P = \begin{bmatrix} & & & 1 \\ & & 1 & \\ & \cdot & & \\ 1 & & & \end{bmatrix} \in R^{P \times P}.$$

Complex conjugation with itself is denoted by an overscore bar $\overline{(\cdot)}$. In the following text, matrices $Q \in C^{p \times q}$ which satisfy the condition:

$$\Pi_p \overline{Q} = Q \leftarrow \rightarrow \Pi_p Q = \overline{Q}$$

are referred to as left $\Pi$-real, in which context reference should be made to the already mentioned references Proc. IEEE Int. Conf. Acoust., Speech, Signal Processing and to the Dissertation by M. Haardt. For example, the poorly filled unitary matrices $$Q_{2n} = \frac{1}{\sqrt{2}} \begin{bmatrix} I_n & jI_n \\ \pi_n & -j\pi_n \end{bmatrix} \text{ and } Q_{2n+1} = \frac{1}{\sqrt{2}} \begin{bmatrix} I_n & 0 & jI_n \\ 0^T & \sqrt{2} & 0^T \\ \pi_n & 0 & -j\pi_n \end{bmatrix}, \quad (21)$$

are left $\Pi$-real of even or odd order.

$$\hat{R}_{xx} = \frac{1}{LP} X_{sub} X_{sub}^H \quad (22)$$

denotes the estimated covariance matrix of the noisy measurements. A sliding window can also be used to calculate $\hat{R}_{xx}$, instead of the rectangular window used in equation (22). Furthermore, $\hat{R}_{nn}$ gives an estimate of the covariance matrix of the additive noise in accordance with (20), which is obtained in a similar way but without the presence of any source signal. These matrices are then transformed in accordance with $$G_{xx} = Re\{Q_{M_{sub}}^H \hat{R}_{xx} Q_{M_{sub}}\} \text{ and } G_{nn} = Re\{Q_{M_{sub}}^H \hat{R}_{nn} Q_{Mdi\,sub}\}, \quad (23)$$

where $Q_{Msub}$ denotes any left $\Pi$-real matrix of size $M_{sub} \times N_{sub}$ which is likewise unitary. The following definition is required first of all in order to specify selection matrices for the 3D unitary ESPRIT method.

$$J_2^{M_{sub_r}} = \begin{bmatrix} 0_{(M_{sub_r}-1) \times I} & I_{M_{sub_r}-1} \end{bmatrix} \quad (24)$$

as a 1D selection matrix corresponding to the maximum overlapping in the r-th dimension, where $1 \leq r \leq R$. Taking into account the R-dimensional stacking process described in the above-noted dissertation by M. Haardt, the desired selection matrices $J_{(r)2}$ are constructed to give $$J_{(1)2} = I_{M_{sub3}} \otimes I_{M_{sub2}} \otimes J_2^{(M_{sub1})} \\ J_{(2)2} = I_{M_{sub3}} \otimes J_2^{M_{sub2}} \otimes I_{M_{sub1}}, J_{(3)2} = J_2^{(M_{sub3})} \otimes I_{M_{sub2}} \otimes I \quad (25)$$

The three corresponding pairs of transformed selection matrices are then given by:

$$K_{(r)1} = 2 \cdot Re\{Q_{m_s}^H J_{(r)2} Q_{M_{sub}}\} \quad (26)$$

$$K_{(r)2} = 2 \cdot Im\{Q_{m_s}^H J_{(r)2} Q_{M_{sub}}\}.$$

For a virtual, uniform, cubic group of $M_{sub} = M_{sub1} M_{sub2} M_{sub3}$ elements then it must be true that:

$$m_r = \frac{M_{sub}(M_{sub_r} - 1)}{M_{sub_r}},$$

in order to achieve a maximum overlap of all the subgroups in all three directions. The number of elements in the subgroups in the $r^{th}$ direction is denoted by $m_r$.

The following text provides a brief summary of the use of the 3D unitary ESPRIT method with colored noise (covariance solution):

1. Signal subspace estimation: Calculate the generalized eigen decomposition of the matrix pair $G_{xx}$ and $G_{nn}$, that is to say $$G_{xx} E = G_{nn} E \cdot \Sigma$$

where $$\Sigma = diag\{\sigma_i\}_{i=1}^M$$

In this case, the dominant generalized eigen vectors of the matrix pair $G_{xx}$ and $G_{nn}$, which are contained in $E_s \in R^{M_{sub} \times K}$ are denoted by K.

2. Solution of the invariance equations: Solve $$\frac{K_{(r)1} G_{nn} E_s Y_\mu}{R^{m_p \times K}} \approx \frac{K_{(r)2} G_{nn} E_s}{R^{m_p \times K}} \quad 1 \leq r \leq R,$$

with the aid of LS, TLS, SLS or 2D SLS (LS=Least Square, TLS=Total Least Square, SLS=Structured Least Square)

3. Joint spatial and time frequency estimation: Calculate the SSD (=Simultaneous Schur Decomposition) of the R real-value K×K matrices $Y_r$ as $$U_r = \Theta^T Y_r \Theta, \quad 1 \leq r \leq R,$$

where $$u_{kk}^{(r)},$$

$1 \leq r \leq K$ represent the diagonal elements of $U_r$ and $$\mu k(r) = 2 \arctan\left(u_{kk}^{(r)}\right), \quad 1 \leq k \leq K, \quad 1 \leq r \leq R.$$

The simultaneous Schur decomposition SSD, which forms a part of the 3D unitary ESPRIT method, is required in order to keep the eigen values of $Y_r$ in pairs automatically. It must be remembered that the real eigen values of the real non-symmetrical matrices can effectively be calculated by means of a real Schur decomposition. For the situation where there is no noise, the new SSD of the R matrices results in $Y_r \Theta R^{d \times d}$ for $1 \leq r \leq R$ R real upper triangular matrices, which automatically have paired real eigen values for their diagonals. However, with additional noise, a square cost function is minimized, as is likewise shown in the dissertation by M. Haardt. The eigen values lead to estimates of the 3D spatial and time frequencies. The resultant R=3-dimensional frequency vectors have the components $$\mu_k^{(1)} = \frac{2\pi\Delta_x}{\lambda}u_k, \; \mu_k^{(2)} = \frac{2\pi\Delta_y}{\lambda}v_k, \; \mu_k^{(3)} = -2\pi\frac{\tau_k}{T} \quad (27)$$

where $T=T_cN_c$ denotes the maximum propagation delay for determining the angles in equation (7). The amplitudes in the space/time domain or in the space/frequency domain can be estimated using the estimated incidence directions and delays.

Estimation of the amplitudes in the space-frequency domain

The data vector $X_{F'}$ is obtained by $$x_{F'}=\text{vec}\{X_{F'}\}\epsilon C^{M_1M_2M_3} \quad (28)$$

in which case $X_{F'}$ can be interpreted as the result of taking a single sample at the time $t_0$. Using a data model based on $$x_f(t_0)=A_\nu S_{F'}(t_0), \quad (29)$$

as used in the dissertation by M. Haardt for three-dimensional spatial filters, the absolute value of the vector $S_{F'}$ indicates the signal power. It must be remembered that the virtual 3D control matrix $A_V$ is different to the 2D control matrix A in equation (8). The virtual 3D control matrix $A_\nu$ is given completely by the spatial frequencies $\mu_k^{(1)}$ and $\mu_k^{(2)}$ and by the spatial frequencies $\mu_k^{(3)}$ as follows:

$$A_\nu=[a(\mu_1^{(1)},\mu_1^{(2)},\mu_1^{(3)})a(\mu_2^{(1)},\mu_2^{(2)},\mu_2^{(3)}) \ldots a(\mu_K^{(1)},\mu_K^{(2)},\mu_K^{(3)})]$$
$$\epsilon C^{M_1M_2M_3\times K}$$

and $$a(\mu_k^{(1)},\mu_k^{(2)},\mu_k^{(3)})=a(\mu_k^{(3)})=a(\mu_k^{(3)})\otimes a(\mu_k^{(2)})\otimes a(\mu_k^{(1)}),$$

provided the array geometry is known and the array is calibrated. The non-inverted noise covariance matrix in the frequency domain $R_{nn,F'}$ is defined as:

$$R_{nn,F'}=E\{n_F n_F^H\}, \quad (30)$$

It must be remembered that the noise nF, in the frequency domain is not white if oversampling is carried out using a rectangular chip signal form. In contrast to $R_{nn}$ in equation (20), the matrix $R_{nn,F'}$ for the variable $M_1M_2M_3\times M_1M_2M_3$ does not include space/frequency smoothing. The linear realistic minimum variance estimation (Gauss-Markow estimation) of the amplitudes $\hat{\rho}_{F'}$ is then calculated using:

$$\hat{P}_{F'}=(\hat{A}_V^H \hat{R}_{nn,F'}^{-1}\hat{A}_V)^{-1}\hat{A}_V^H \hat{R}_{nn,F'}^{-1}\cdot x_{F'}\epsilon C^k, \quad (31)$$

where the coefficients of $\hat{\rho}_{F'}$ PF denote the estimated amplitudes of K wave fronts.

With regard to the estimation of the amplitudes in the space/time domain, it should be noted that, in general, better accuracy is achieved by solving the model equation (4) in the space/time domain. The deterioration resulting from inaccurate estimation of the frequencies $\mu_k^{(1)}, \mu_k^{(2)}$ and $\mu_k^{(3)}$ is not so significant. If the vector $S_{PN}(\mu_k^{(3)})$ includes the sampled and the time-delayed PN sequences corresponding to the delay $\tau_k$, where $$\mu_k^{(3)} = -2\pi\frac{\tau_k}{T},$$

equation (4) can be written as $$X = \sum_{k=1}^{K} p_k a(\mu_k^{(1)}, \mu_k^{(2)},)S_{PN}(\mu_k^{(3)})^T \quad (32)$$

using $\text{vec}\{Y_1Y_2Y_3\}=(Y_3^T\otimes Y_1)\text{vec}\{Y_2\}$ equation (32) is developed to become:

$$\text{vec}\{X\} = \sum_{k=1}^{K} p_k [S_{PN}(\mu_k^{(3)})\otimes a(\mu_k^{(1)}, \mu_k^{(2)})] \quad (33)$$

The operator $\otimes$ denotes the Kronecker product. If the noise n is not white, the noise covariance matrix must be taken into account. In contrast to equation (10) the noise for the complete sequence must be considered, if the noise covariance matrix is calculated using:

$$R_{NN}=E\{\text{vec}\{N\}\text{vec}\{N\}^H\}\epsilon C^{M_1M_2M_3\times M_1M_2M_3} \quad (34)$$

where $$N=[n[1]n[2]\ldots n[N]]\epsilon C^{M_1M_2M_3}$$

Solving equation (33) for $\rho_T$ leads to the estimated amplitudes $\hat{\rho}_{T,1},\hat{\rho}_{T,2}\ldots \hat{\rho}_{T,K}$.

$$\hat{\rho}_T=(B^H\hat{R}_{NN}^{-1}B)^{-1}B^H\hat{R}_{NN}^{-1}\cdot\text{vec}\{X\} \quad (35)$$

where $$B=[S_{PN}(\tau_1)\otimes a(\mu_1^{(1)},\mu_1^{(2)})S_{PN}(\tau_2)\otimes a(\mu_2^{(1)},\mu_2^{(2)})\ldots$$
$$S_{PN}(\tau_K)\otimes a(\mu_K^{(1)}\mu_K^{(2)})]$$

With regard to the practical technical implementation, it should first of all be reiterated that, depending on the transmission and reception position, the radio channel can be characterized by the number of wave fronts K arriving at the receiver together with their complex amplitudes $\rho_k$, delays $\tau_k$ and arrival angles $\phi_k$ in azimuth and $\phi_k$ in elevation.

The following three steps are critical in this case:

Production and transmission of the transmitted signal s(t) with a test pulse sequence.

Reception by means of a two-dimensional antenna array, the transformation to baseband by downmixing and sampling.

Digital signal processing with preprocessing by a matched filter, transformation to the space/frequency domain, and consideration of the pulse form with corresponding corrections. Finally, estimation of the parameters, namely by joint parameter estimation preferably by means of a 3D unitary ESPRIT method and joint estimation of the complex amplitudes.

These steps will be explained in more detail in the following text.

Production of the Transmission Signal

The transmission signal $$S'(t) = \sum_{i=0}^{P} c(t - iT) \quad (36)$$

where $$c(t) = \sum_{m=0}^{N_c-1} d_m p_c(t - mT_c)$$

comprises P+1 pulse sequences. Each pulse sequence c(t) is modulated by a pseudo-random noise sequence $d_m$ of length $N_c$. The bandwidth of the pulse is governed by the bandwidth of the radio channel to be measured. The amplitudes of the transmitted signal $$S'(t)=s(t)+A \text{ are shifted by } A=(1-\sqrt{N_c+1})/N_c \quad (37)$$

in order to correspond to the required model in the space/frequency domain. Furthermore, A is chosen such that the signal-to-noise ratio on reception is optimized, that is to say a matched filter is used. This signal s' (t) is produced in baseband, is mixed to the radio-frequency band to be measured, and is transmitted.

Reception and Evaluation of the Transmission Signal Preprocessing

Signal-matched Filter

The receiving device comprises a rectangular, two-dimensional antenna array composed of $M_1 \times M_2$ antennas, with unitary ESPRIT requiring an antenna array which is symmetrical about the center. The received signals are downmixed to baseband and are sampled at an integer multiple $M_c$ of the fundamental sampling rate $1/T_c$. The sampled signals are correlated with the sequence:

$$c'\left(n \cdot \frac{T_c}{M_c}\right) = c\left(n \cdot \frac{T_c}{M_c}\right) + b\left(n \cdot \frac{T_c}{M_c}\right), \quad (38)$$

then $$b\left(n \cdot \frac{T_c}{M_c}\right) = \begin{cases} (1+A)/(A \cdot N_c - 1), & 0 \le n < N_c M_c \\ 0, & \text{otherwise} \end{cases}$$

This results in a matched filter MF, that is to say $$c'\left(n \cdot \frac{T_c}{M_c}\right) = s'\left(-n \cdot \frac{T_c}{M_c}\right)$$

If the chosen pulse form $P_c(t)$ is taken into account in conjunction with (37) and (38), see below, then each wave front results in time-invariance in the space/frequency domain.

Consideration of the Pulse Form

The output from the matched filter $X_{MF}(i) \in C^{M_1 M_2 \times N_c M_s}$ is transformed to the space/frequency domain, $$X_F(i)=X_{MF}(i)W, \quad (39)$$

where $W \in C^{N_c M_c \times M_3}$ is a matrix of the discrete Fourier transformation (DFT). Only those $M_3$ spectral lines are calculated for which the magnitude of the cross-correlation function (transformed to the frequency domain) of the sampled sequences c' (n) and s' (n), $|R(1)|$, exceeds a limit value T.

The influence of the pulse form and the oversampling are calculated from $X_F$ in the spatial frequency by substituting $$F = \text{diag}\left\{R\left(N_c M_c - \frac{M_3-1}{2}\right), \quad (40)\right.$$
$$\left. \ldots, R(N_c M_c - 1), R(0), R(1), \ldots, R\frac{M_3-1}{2}\right\}$$

in $$X_{F'}(i) = X_F(i)F^{-1}$$

The drawing shows only the matrix $X_F$. Consideration of the chip signal form then leads to the matrix $X_{F'}$. Using this approach, the lines of the matrix $X_{F'}$ (i) in the space/frequency domain are invariant in the time direction (irrespective of the pulse form $P_c$ and the oversampling factor $M_c$) for each wave front. The P sequences in the space/frequency domain $$\chi_{F'}(i) = \text{vec}\{X_{F'}(i)$$

are combined, $$X_{F'}=[\chi_{F'}(1)\chi_{F'}(2) \ldots \chi_{F'}(P)]$$

and smoothed $$X_{sub}=[J_{1,1,1}X_F J_{1,1,2} X_{F'} \ldots J_{1,1,L_3} X_F J_{1,2,1} X_{F'} \ldots$$
$$J_{L_1 L_2 L_3} X_{F'}] \in C^{M_{sub} \times LP} \quad (41)$$

The smoothing results in correlated wave fronts being decorrelated, and the dimension of the signal covariance matrix $$R_{xx} = \frac{1}{LP} \cdot X_{sub} X_{sub}^H \in C^{M_{sub} \times M_{sub}} \quad (42)$$

being reduced, that is to say $M_{sub} < M$. This leads to reduced computation complexity for the breakdown of the eigen values in (43). The noise covariance matrix $R_{nn}$ can be calculated offline. Even if the noise that is present at the antenna array is uncorrelated in the space and time directions, the noise in the frequency domain is often not uncorrelated in time. In this case, $R_{nn}$ is not a scaled diagonal matrix.

Parameter Estimation 3D unitary ESPRIT taking account of colored noise.

The complex covariance matrices $R_{xx}$ and $R_{nn}$ are transformed into real matrices $G_{xx}$ and $G_{nn}$ using (23). A generalized eigen value decomposition $$G_{xx}E = G_{nn}E \cdot \Sigma \text{ with } \Sigma=\text{diag}\{\sigma_i\}_{i=1}^{M_{sub}} \quad (43)$$

gives $E \in C^{M_{sub} \times M_{sub}}$. The columns for $E_s$ comprise dominant, generalized eigen vectors, that is to say those columns of E, which belong to the K' dominant (largest) generalized eigen values $C_k$. These columns of $E_s$ cover the estimated subspace, where K' denotes the number of dominant wave fronts. The subspace estimate Es is used to produce three invariance equations:

$$K_{(r)1} G_{nn} E_s Y_r \approx K_{(r)2} G_{nn} E_s \in R^{m_r \times k'} \quad (44)$$

r=1,2,3 which are solved, for example, for $Y_r$ using the least squares method. The spatial and time frequencies sought $$\mu_k^{(1)} = \frac{2\pi\Delta_x}{\lambda} u_k \quad \mu_k^{(2)} = \frac{2\pi\Delta_y}{\lambda} v_k \quad \mu_k^{(3)} = 2\pi\frac{\tau_k}{T} \quad (45)$$

can be determined by simultaneous Schur decomposition of the three matrices $Y_r$. Using $v_k = \cos\phi_k \sin\theta_k$ and $v_k = \sin\phi_k \sin\theta_k$, the spatial frequencies $\mu_k^{(1)}$ and $\mu_k^{(2)}$ give the incidence angles ($\phi_k$ in azimuth and $\theta_k$ in elevation) sought, and the time frequencies $\mu_k^{(3)}$ give the delays $\tau_k$ of the individual wave fronts.

Joint Estimation of the Complex Amplitudes

In order to estimate complex amplitudes, the signal matrix $S \in C^{K' \times QN_sM_c}$ is constructed from the delays $I_k$, and the control matrix $A_a \in C^{M_1M_2 \times K'}$ is constructed from the spatial frequencies $\mu_k^{(1)}$ and $\mu_k^{(2)}$. The complex amplitudes $$= (B^H R_{NN}^{-1} B)^{-1} B^H R_{NN}^{-1} \cdot \text{vec}\{X\} \text{ with } B = S^T \diamond A_a \quad (46)$$

are estimated over $Q \leq \rho$ sequences in the space/time domain. $R_{NN}$ is the estimated noise covariance matrix in the time domain.

Using signal processes which are known from digital receiver technology, all the method steps can be carried out in a measurement configuration comprising a planar, preferably rectangular antenna array and a measurement receiver with appropriate receiver stages.

In summary, the advantages over the known methods can be stated to be as follows:

The signal-to-noise ratio is maximized by varying the transmission and correlation sequence while maintaining the time invariance relationship, the pulse form in the space/frequency domain is taken into account, any desired choice of the pulse form and any desired integer sampling factor may be used, elimination of the weak spectral lines leads to the influence of the noise being reduced and reduces the computation complexity, high-resolution joint estimation of the azimuth, elevation and delay is possible by using the 3D unitary ESPRIT method and by transformation to the space/frequency domain over P sequences, and the 3D unitary ESPRIT method can likewise be expanded to take account of the colored noise in the space/frequency domain, and joint estimation of the amplitudes in the space/time domain is possible over Q sequences.

We claim:

1. A method for measuring characteristics of radio channels, which comprises:
   transmitting a transmission signal containing a preselected test sequence;
   receiving received signals with a plurality of receiving sensors in a two-dimensional antenna array, the respective received signals being composed of wave elements of the transmission signal with regard to an azimuth $\phi_k$ and an elevation $\theta_k$ of different incidence direction and different delay;
   demodulating and subsequently sampling the received signals;
   calculating eigenvalues corresponding to dominant eigenvalues with samples obtained in the sampling step, and deriving a signal subspace matrix from the calculated eigen vectors;
   establishing invariance equations dependent on the signal subspace matrix; and
   simultaneously determining estimated values for the incidence direction and delays of dominant wave fronts by solving the invariance equations.

2. The method according to claim 1, wherein the test sequence has a chip signal form, and the method comprises taking account of the chip signal form in the step of determining the estimated values.

3. The method according to claim 2, which comprises sampling with a total of $M_c$ samples per chip of the test sequence.

4. The method according to claim 3, which comprises transforming the samples to the frequency domain, and correcting the transformed samples by division by a square of a spectrum of the chip signal form of the test sequence.

5. The method according to claim 2, which comprises correcting the samples taking account of a spectrum of the chip signal form in the test sequence, wherein the line vectors formed from corrected samples for the receiving sensors can be combined to form a data matrix $X_{F'}(n)$ containing invariances characterizing the channel.

6. The method according to claim 1, which comprises transforming the samples to the frequency domain by discrete Fourier transformation.

7. The method according to claim 1, which comprises choosing a modulated pseudo-random noise sequence for the transmission signal.

8. The method according to claim 1, which comprises mixing the signals received by the receiving sensors before being demodulated to baseband.

9. The method according to claim 1, which comprises filtering the samples with signal-matched filtering.

10. The method according to claim 1, wherein the sampling step comprises sampling the received signals at a sampling frequency greater than twice a received signal bandwidth.

11. The method according to claim 1, which comprises transforming the samples to the frequency domain and rejecting samples lying below a predetermined power limit.

12. The method according to claim 1, which comprises smoothing the samples in a space/frequency domain.

13. The method according to claim 1, which comprises determining and associating superimposed, spatial and time invariances with the aid of a two-dimensional, high-resolution frequency estimation algorithm in a space/frequency domain.

14. The method according to claim 13, which comprises taking colored noise in the space/frequency domain into account in the three-dimensional, high-resolution frequency estimation algorithm.

15. The method according to claim 14, which comprises selecting a 3D unitary ESPRIT method as the frequency estimation algorithm.

16. The method according to claim 13, which comprises pairing the estimated values by subjecting the three matrices from whose eigenvalues the three-dimensional frequency estimated values are obtained to simultaneous Schur decomposition.

17. The method according to claim 1, which comprises jointly estimating complex amplitudes in at least one of a space/frequency domain and in a space/time domain.

18. The method according to claim 17, which comprises jointly estimating with a weighted least squares method.

19. A measurement configuration for measuring characteristics of radio channels, comprising:
   a linear antenna array;
   a plurality of receiving sensors;
   an analog/digital sampling device connected to an output of one of said receiving sensors;
   a matched filter connected to said sampling device;
   a device for discrete Fourier transformation; and
   at least one signal processor configured to perform the method according to claim 1.

* * * * *

UNITED STATES PATENT AND TRADEMARK OFFICE
CERTIFICATE OF CORRECTION

PATENT NO. : 6,311,043 B1
DATED : October 30, 2001
INVENTOR(S) : Martin Haardt et al.

It is certified that error appears in the above-identified patent and that said Letters Patent is hereby corrected as shown below:

<u>Title page,</u>
Item [30], should read as follows:
-- Dec. 5, 1997 (DE) ............... 197 54 030.9 --

Signed and Sealed this

Eighteenth Day of March, 2003

JAMES E. ROGAN
*Director of the United States Patent and Trademark Office*